UNITED STATES PATENT OFFICE.

JOHN JOSEPH CHAS. SMITH, OF PHILADELPHIA, PENNSYLVANIA.

IMPROVEMENT IN MAKING PRINTERS' TYPE.

Specification forming part of Letters Patent No. 45,353, dated December 6, 1864; antedated November 30, 1864.

*To all whom it may concern:*

Be it known that I, JOHN JOSEPH CHARLES SMITH, of the city of Philadelphia, and State of Pennsylvania, have invented a new and useful Improvement in the Process of Making Printing-Type; and I do hereby declare that the following is a full, clear, and exact description thereof.

In another application that I have made for Letters Patent for an improvement in the process of making printing-type I have described the mode of casting strips of type metal and of uniting to them rows of electrotyped type-heads.

The present improvement consists in producing such strips from rolled metal drawn to a uniform thickness and of the proper width, and then soldering the rows of type-heads to the strips in the manner hereinafter described.

I cut from a sheet of rolled zinc or other metal strips in width equal to the required height of the body of the printing-type. These strips I draw through a drawing-tool suitable for the purpose and similar to the tool employed in drawing wire, thus securing for them the requisite uniformity of thickness. To one of the edges of each of such strips I temporarily fasten a row of the electrotyped type-heads with fine wire wound around the strips and heads. I then expose the strips and type-heads so fastened together to heat sufficient to melt the solder on the backs of the type-heads, by this means permanently fastening the row of type-heads to the strip.

Another mode of securing the type-heads to the strip is to have a bar of cast-iron containing one or more grooves, each groove about three-eighths of an inch in depth, and in width equal to the thickness of the strip. In each of the grooves I place a row of electrotyped type-heads, faces down, and on top of the row of type-heads I place the strip edgewise. I then expose the bar to heat sufficient to melt the solder on the backs of the rows of type-heads. The strips, being allowed to cool, are withdrawn from the grooves and afterward cut up into single type by means of the cutting-machine that I have described in another application for Letters Patent.

Having thus described my invention, what I claim, and desire to secure by Letters Patent, is—

The manufacturing of printing-type by forming the bodies thereof out of a strip of rolled metal drawn to a uniform thickness and of the proper width, and soldering to one edge of the strip a row of electrotyped type-heads, and then cutting the said strip into single type, in the manner substantially as above described.

JOHN JOS. CHARLES SMITH.

Witnesses:
   J. E. SHAW,
   CHAS. B. HELFENSTEIN.